United States Patent [19]

Whiteside et al.

[11] Patent Number: 4,464,329

[45] Date of Patent: Aug. 7, 1984

[54] DIFFERENTIAL PRESSURE SYNTHETIC PLASTIC FORMING MACHINE AND METHOD WITH FORMED ARTICLE CARRIER MEANS

[75] Inventors: Robert C. Whiteside, Harrison; Fred L. Greynolds, Beaverton, both of Mich.

[73] Assignee: Leesona Corporation, Beaverton, Mich.

[21] Appl. No.: 394,258

[22] Filed: Jul. 1, 1982

[51] Int. Cl.³ .................... B29C 17/04; B29C 17/08
[52] U.S. Cl. .................................... 264/544; 264/550; 264/553; 425/302.1; 425/388; 425/403.1
[58] Field of Search ............... 264/544, 550, 554, 553, 264/551, 403.1; 425/422, 444, 164, 166, 167, 176, 235, 236, 351, 388, 387.1, 302.1

[56] References Cited

U.S. PATENT DOCUMENTS

| | | | |
|---|---|---|---|
| 2,531,540 | 11/1950 | Smith | 264/550 |
| 3,346,923 | 10/1967 | Brown et al. | 425/162 |
| 3,357,053 | 12/1967 | Lyon et al. | 264/550 |
| 4,157,888 | 6/1979 | Sikorski | 425/444 |
| 4,204,824 | 5/1980 | Paradis | 425/444 |

*Primary Examiner*—Jan H. Silbaugh
*Assistant Examiner*—Hubert C. Lorin
*Attorney, Agent, or Firm*—Learman & McCulloch

[57] ABSTRACT

A differential pressure forming machine with upper and lower mold members for forming cup-like articles in a web of thermoplastic material includes a mold assembly in which two separable die members, when in their closed position cooperatively form an article defining mold cavity which extends through one member and into the other. The two die members, when opened, are spaced from each other by a distance greater than the depth of the formed article. An endless chain of carrier members is located with one run extending between the two die members. Each carrier member has an opening smaller than the circumference of the formed article. Closing of the die members expands the carrier member opening outwardly of the periphery of the die cavity and closing of the entire mold assembly in the forming operation effects a severing of the formed article from the web. Upon subsequent opening of the die, the carrier member opening contracts, gripping the formed article to convey it clear of the mold as the next carrier member in the chain is advanced with the web into operative relationship with the mold. At a collection station a discharge member operative with the plug assist of the forming machine removes the formed and separated article from the carrier member.

18 Claims, 10 Drawing Figures

DIFFERENTIAL PRESSURE SYNTHETIC PLASTIC FORMING MACHINE AND METHOD WITH FORMED ARTICLE CARRIER MEANS

BACKGROUND OF THE INVENTION

The present invention is especially directed to an arrangement by which articles of a generally cup-like configuration formed in a web of thermoplastic material and severed from the web in the mold may be conveyed clear of the mold in a controlled manner.

In a typical article forming operation of the type with which the present invention is concerned, a web of thermoplastic material is fed in step-by-step movement into operative relationship with a mold or die assembly having an article forming cavity located at one side of the web. Upon closure of the assembly, a portion of the web is displaced into the cavity, as by a plug assist operation, and the application of differential pressure to the cavity draws the thermoplastic sheet firmly against the cavity wall to thereby form a cup-like article. Because this operation involves the closing of a mold, it is convenient to employ, as the final step of the forming process, a severing step by means of which the formed article is severed from the web of material. While this operation offers the advantage of highly precise severing by means of a relatively simple mechanism, it frequently presents a problem as to how the now-severed article is to be transferred clear of the mold to a collecting station. It has been suggested that this transfer may be accomplished either by directing an air jet against the article or by using ejector pins to push the article clear of the mold (see Lyon U.S. Pat. No. 3,357,053 and Cheney U.S. Pat. No. 3,450,807). Both of these latter techniques provide for but a limited range of movement of the article and leave something to be desired insofar as accurate guidance of the article to a desired location is concerned.

The present invention is especially directed to a carrier means in the form of an endless chain of carrier members which grip the article immediately upon opening of the mold and carry the severed article from the mold along a precisely determined discharge path.

SUMMARY OF THE PREFERRED FORM OF THE INVENTION

In accordance with the present invention, the mold cavity defining assembly of a differential pressure forming mechanism is made up of two axially separable die members, the mold cavity passing entirely through one member and partially into the other. When the two members are in a closed position, they cooperatively define the article forming mold cavity; when the two members are opened, they are axially spaced from each other by a distance greater than the depth of the mold cavity.

An endless chain of carrier members is located with one run of the endless chain extending between the two die members. Each carrier member includes a flat sheet of a resiliently flexible material formed with an opening having a circumference somewhat smaller than the circumference of the article to be formed in the mold cavity. With the two die members in their open position, the chain of carrier members is advanced to locate a carrier member between the two die members with the opening in the carrier member located in coaxial relationship with the two mold cavity forming portions in the opened die members. One of the die members is formed with an axial projecting rim or flange around the periphery of the mold cavity, and upon closing of the die members, this projecting rim or flange engages the carrier member to expand its central opening by flexing the carrier member radially outwardly away from the mold cavity as the two die members close.

After the article has been formed and severed, the die members open and the opening in the carrier member contracts to resiliently circumferentially grip the formed and severed article to be carried clear of the mold as the chain of carrier members is advanced one step.

Other objects and features of the invention will become apparent by reference to the following specification and to the drawings.

IN THE DRAWINGS

Figure 2:
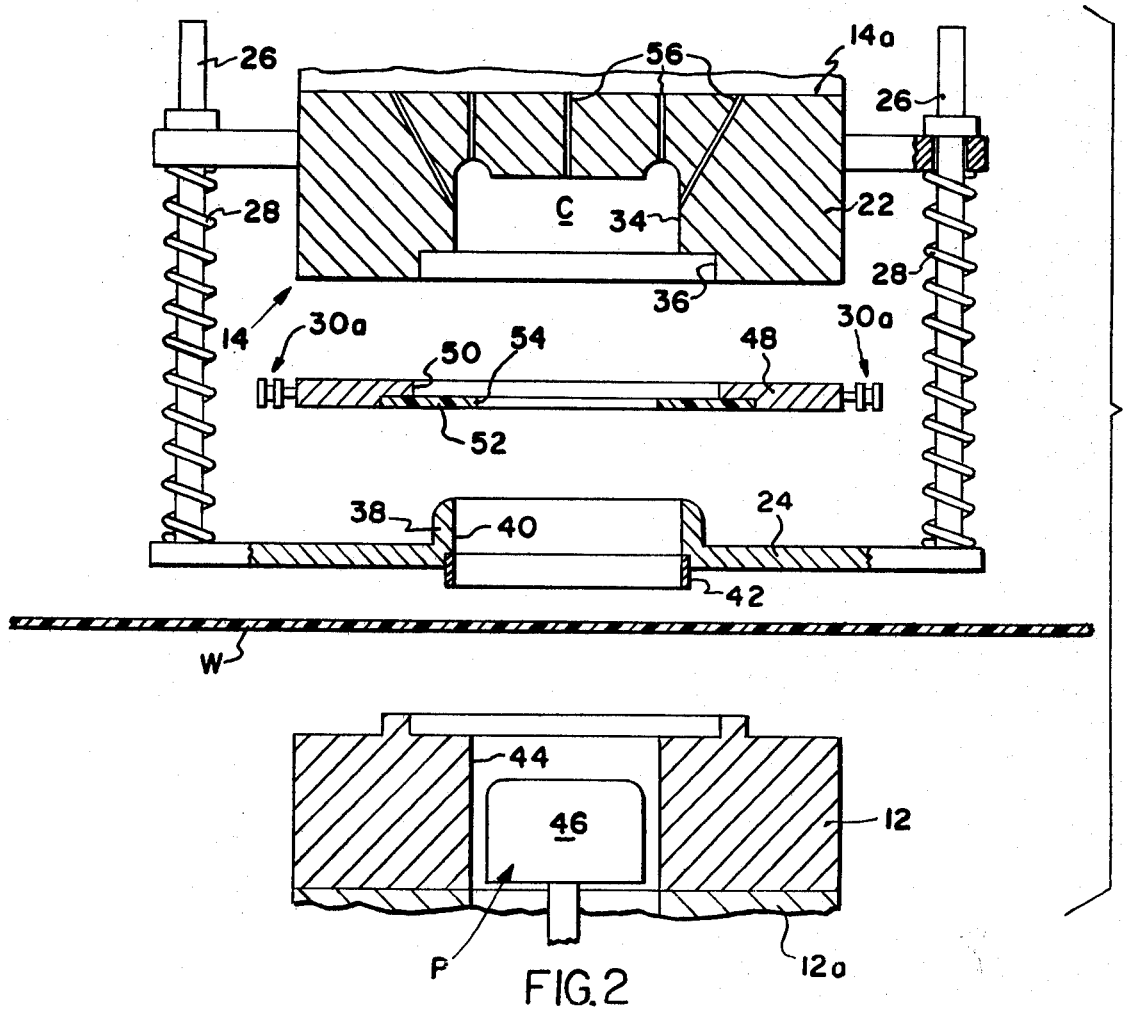
FIG. 2 is a schematic cross-sectional elevational view of the mold, web, and a portion of the carrier member chain of the machine of FIG. 1, showing the die assembly in its fully opened position.
Figure 6:
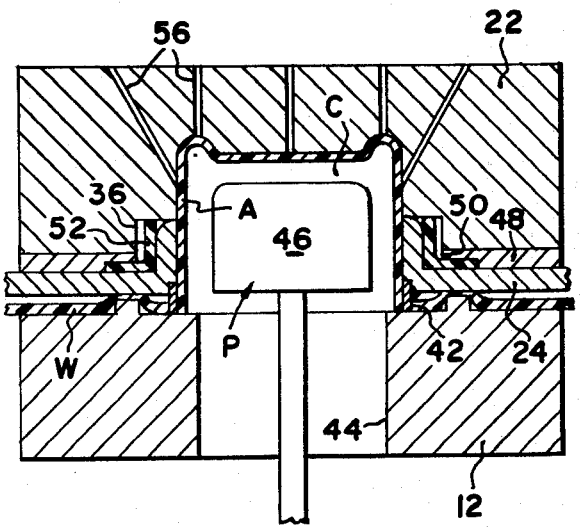
Figure 7:
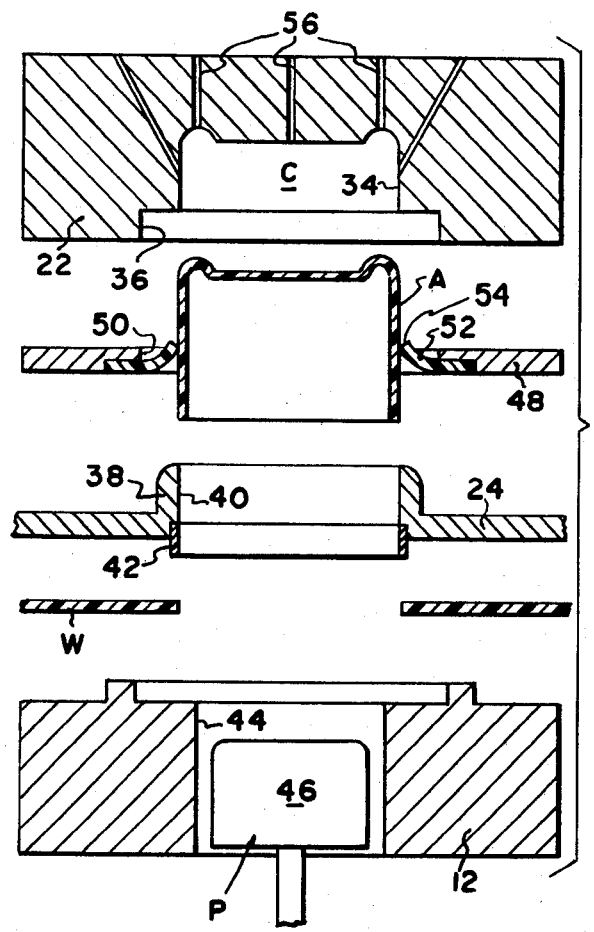
Figure 8:
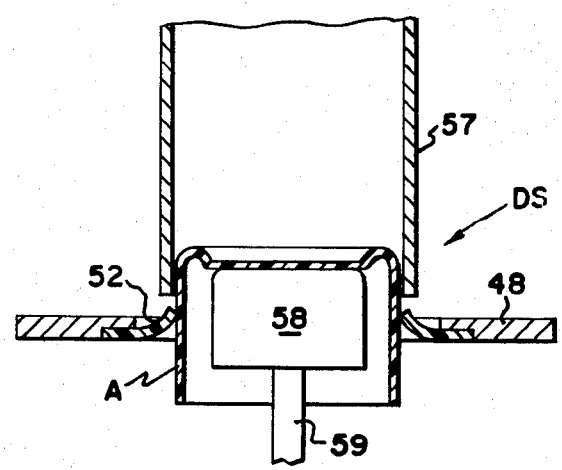
Figure 9:
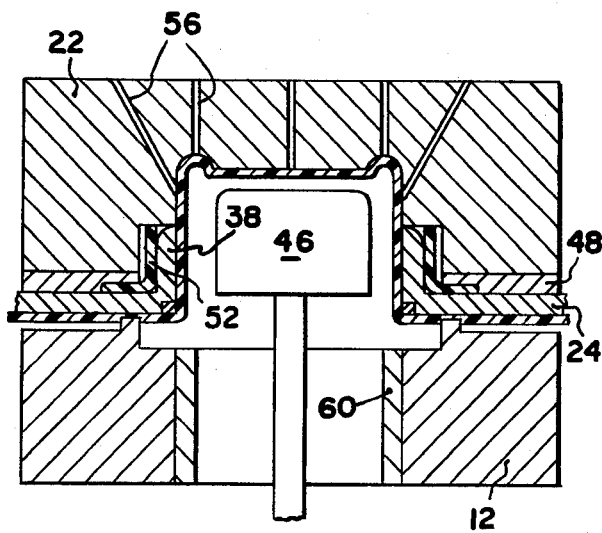
Figure 10:
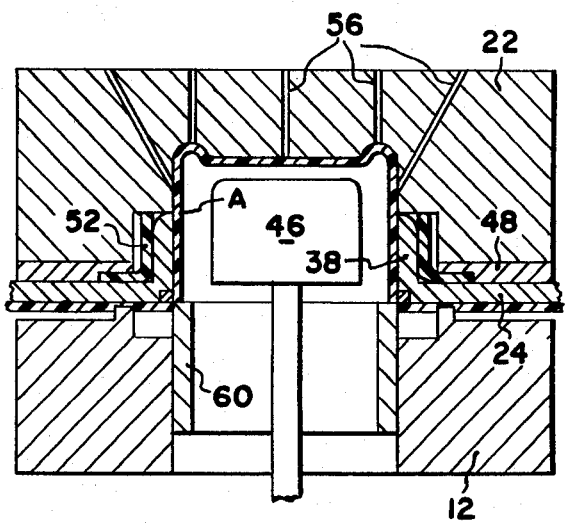

FIGS. 3 through 7 inclusive respectively show the elements schematically illustrated in FIG. 2 in successive steps of the mold closing, article forming, severing and article gripping phases of the operation; and FIG. 8 is a schematic elevational view illustrating the manner in which separation of the articles from the carrier band can be accomplished;

FIGS. 9 and 10 are schematic cross-sectional elevational views similar to those of FIGS. 2-7, showing a modified form of severing operation.

Figure 1:
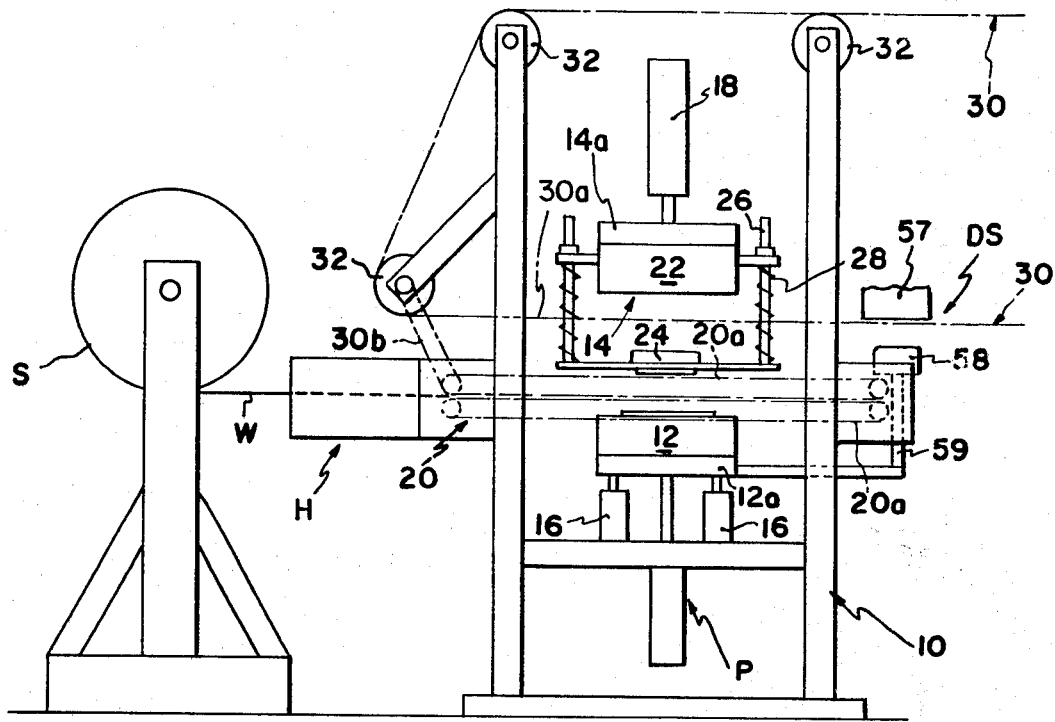
FIG. 1 is a schematic side elevational view of a differential pressure forming machine embodying the present invention.

Referring first to FIG. 1, a schematic diagram of a differential pressure forming machine embodying the present invention is shown. The machine as schematically illustrated in FIG. 1 includes a frame, designated generally 10, upon which is mounted a lower mold platen designated generally 12a mounting lower mold 12 and an upper mold platen or assembly designated generally 14a mounting an upper mold assembly 14. The upper and lower platen assemblies 12a and 14a may be mounted for vertical reciprocatory movement as viewed in FIG. 1 relative to frame 10 as by fluid rams or motors 16 and 18 respectively, and a plug assist mechanism P may be mounted on the lower platen 12a. Alternatively, the platens 12a and 14a may be linkage driven by cams in the manner indicated in the present assignee's U.S. Pat. No. 4,158,539. The operation of the motors 16 and 18 may be controlled in a well-known manner, see, for example, U.S. Pat. No. 3,346,923.

A web of thermoplastic material W provided from a supply roll S(or from an extruder) is fed in step-by-step movement along a path extending through web heater housing H and between the lower and upper platen assemblies 12a and 14a as by a power driven chain assembly designated generally 20, (see U.S. Pat. No. 3,216,491). In FIG. 1, the mold assemblies are shown in their fully open positions, and when so opened, the power driven chains 20a which grip the side edges of the web W are actuated, by means well-known in the art (see U.S. Pat. Nos. 3,346,923 and 3,217,852), for example, to advance the web of thermoplastic material W one step, at which time the mold assemblies are closed and an article is formed in web W within a mold cavity, generally located in the upper die assembly, and severed from the web after its formation while the two molds are still closed. The molds are then opened, the web W again advanced, and the article forming and severing operation repeated. Generally speaking, this operation is well-known in the art, one example being that of U.S. Pat. No. 3,346,923, and all of the prior art patents mentioned herein being incorporated herein by reference.

The present invention is especially directed to an arrangement by which the articles, after being formed and severed from web W, can be efficiently removed from the mold and conveyed along a predetermined path to a remote location for collection. Upper platen assembly 14a mounts a main or upper die member 22 and a lower or auxiliary die member 24. To accomplish the purposes of the present invention, the two die members 22 and 24 must be capable of moving relative to one another. For purposes of illustration, it will be assumed that lower die member 24 is provided with four vertically extending rods 26 which are slidably received in the upper die member 22. Compression springs 28 normally urge the two die members to the separated positions shown in FIG. 1.

An endless band of carrier members designated generally 30, mounted by chain members (30a) is operatively trained about guide sprockets such as 32, rotatably mounted upon frame 10 and arranged so that one run of endless band 30 extends through the space between die members 22 and 24. Chains 30 are driven by suitable means, not shown, as from the drive for chains 20a via chain 30b in step-by-step movement synchronized with the opening and closing of die members 22 and 24 and thus are synchronized with the step-by-step movement of the web feeding apparatus 20. The endless chains 30a are only partially shown in FIG. 1; but may extend to another machine, or to a suitably located discharge station DS such as shown in FIG. 8, at which articles are removed from the chain driven band 30.

Referring now to FIG. 2, the mold assemblies, carrier chains 30a, and web W are schematically shown in a cross-sectional view. In FIG. 2, the two upper die members 22 and 24 are shown in their fully opened position. Die member 22 is formed with a downwardly facing mold cavity portion 34 having an enlarged diameter annular recess 36 at the lower surface of die member 22.

Die member 24 is of a flat, plate-like configuration having an upwardly projecting flange 38 whose outer periphery is adapted to fit freely within recess 36 when the two members 22 and 24 are closed. A central passage 40 coaxially aligned with the mold cavity 34 of upper die member 22 extends entirely through the lower die member 24, the bottom end of the passage being defined by an annular steel rule severing ring member 42 which performs, as will be described below, an article severing function in conjunction with lower die member 12.

Lower die member 12 is formed with a central passage 44 accommodating a plug assist head 46 of a type well-known to those in the art.

The endless carrier chain assembly 30 includes a series of flat plates 48 flexibly linked together via the endless chains 30a. Each plate 48 has a central opening 50 of greater diameter than that of enlarged diameter recess 36 of upper die member 22, and permanently bonded to each plate 48 within opening 50 is an annular ring of resiliently flexible sheet material 52 which is permanently bonded to plate 48. Flexible member 52 is formed with a central opening 54 of a diameter smaller than that of passage 40 of die member 24 and recess 34 of die member 22.

As best seen in FIG. 2, die members 24 and 22 are both located above web W which in turn passes above the lower die assembly 12. In FIG. 2, the mold assemblies are shown in their fully open position, at which time opening 54 in the flexible carrier plate member 52 is in coaxial alignment with recess 34 and passage 40. This relationship is the starting point of the operational sequence.

Figure 3:
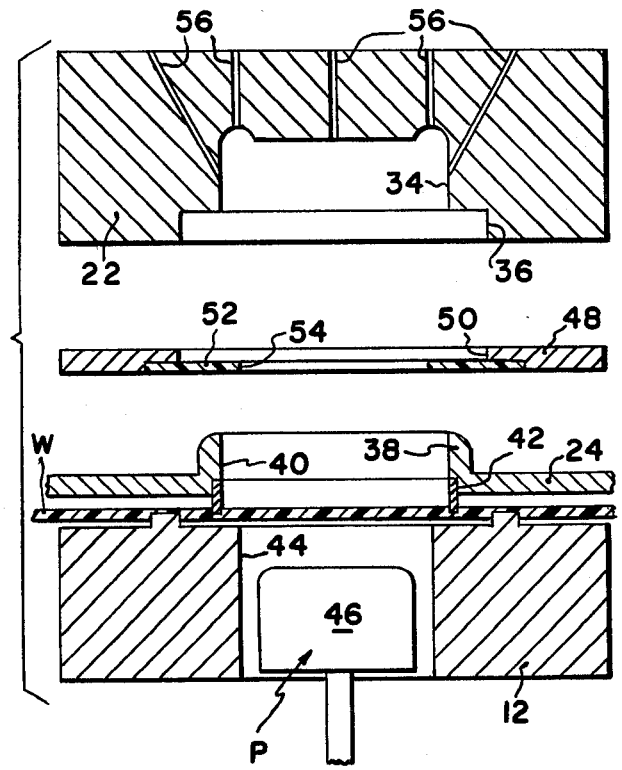

In FIG. 3, lower die member 12 has been elevated into contact with the underside of web W, while the two upper die members 22 and 24 have been lowered from their FIG. 2 position with the steel rule 42 of member 24 now contacting the upper surface of web W.

Figure 4:
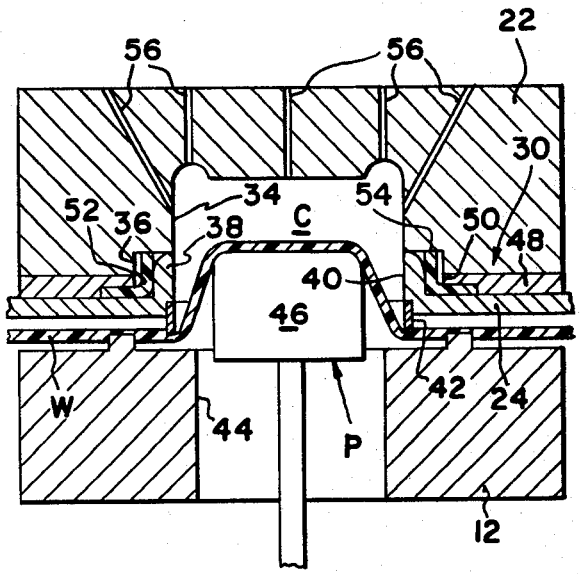

Referring now to FIG. 4, die member 22 has been further lowered from its FIG. 3 position to grip the plate 48 of carrier member 30 between its lower surface and the upper surface of die member 24. The peripheral flange 38 on die member 24 has engaged and deflected upwardly the resiliently flexible member 52 on plate 48, thereby expanding opening 54 in member 52 so that it is peripherally forced radially outwardly of the die cavity into enlarged diameter recess 36 of the upper member 22. The upper edge of flange 38 on die member 24 is now seated against the inner shoulder of recess 36 and the passage 40 through member 24 mates with the wall of recess 34 in upper member 22, passage 40 and recess 34 now cooperatively defining a complete article-forming cavity c. In FIG. 4, plug assist member 46 is elevating to deform the web W into the cavity c.

Figure 5:
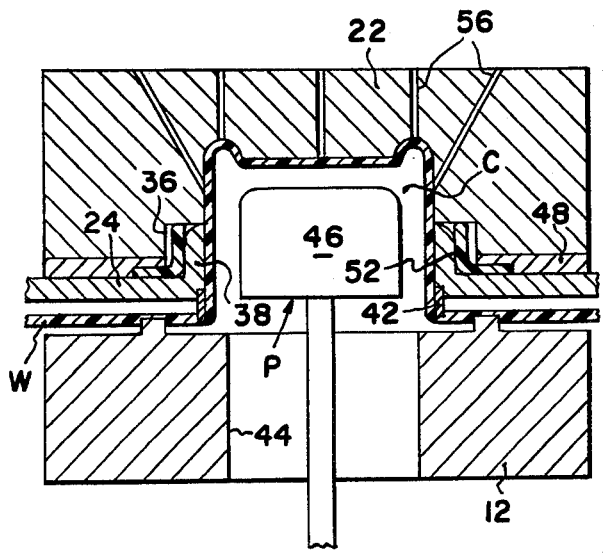

Referring now to FIG. 5, vacuum port means, such as passages 56 in communication with a vacuum pump, have been actuated to firmly draw the web W against the wall of the die cavity to form the article to the shape of the cavity c.

In FIG. 6, the formed article is shown being severed from web W by a slight upward movement of lower die member 12 which causes steel rule 42 to sever the article A from the web W.

In FIG. 7, the various parts are shown as being returned to the position shown in FIG. 1, with the exception that the formed article A is now resiliently gripped within the opening 54 in the flexible member 52 of carrier plate 48 so that advancement of the endless chain of plates 48 will convey the completed article A clear of the now opened mold assembly. It will be noted that in the fully open position of FIG. 7, the two die members 22 and 24 are spaced from each other by a distance greater than the height of the article (or depth of the mold cavity) to provide adequate clearance for removal of the article A.

In FIG. 8, a discharge station DS is disclosed as including a suction tube 57 communicating with a suitable vacuum pump or other suction source. A discharge head or punch 58 may be connected by an L-shaped connector member 59 to the plate 12a (see FIG. 1) so that when platen 12a (see FIG. 1) moves to closed position, removal head 58 will simultaneously move an article A, which has previously been severed, upwardly beyond the flexible ring 52 aligning with collecting tube 57 and into tube 57 for removal by suction. The position of tube 57 therefore with respect to mold cavity C (see FIG. 2) is such that, at the time of incremental advance of web W to dispose a new area of plastic web between molds 14 and 12, a previously severed article A, carried by the member 52, is vertically aligned with the open end of tube 57. Alternately to providing L-shaped connector 59, a limit switch operated by platen 12a could be energized to activate an air operated cylinder or motor to move head 58 upwardly to accomplish the article separating operation.

In FIGS. 9 and 10, an alternative form of severing operation is shown as including a reciprocal punch member 60 mounted upon the lower die member 12 which is reciprocated to the FIG. 9 position in a well-known manner to perform the severing operation. Otherwise, the embodiment of FIGS. 9 and 10 and the operational sequence of operation of that embodiment are similar to that described above in connection with FIGS. 1–7.

While exemplary embodiments of the invention have been described in detail, it will be apparent to those skilled in the art that the disclosed embodiments may be modified. Therefore, the foregoing description is to be considered exemplary, rather than limiting, and the true scope of the invention is that defined in the following claims.

What is claimed is:

1. In a differential pressure forming machine for forming cavity shaped articles in a web of thermoplastic material, said machine including web conveying means for advancing a web of thermoplastic material in step-by-step movement to a work station, mold means at said work station movable between an open and a closed position relative to said web in synchronism with the movement of said web by said web conveying means, said mold means including a first die assembly, means on said first die assembly defining an article forming cavity therein into which a portion of said web is displaced during the article forming operation, and means on said mold means for severing the article from the web upon the completion of the formation of the article; the improvement comprising carrier means associated with said first die means and including a resiliently flexible carrier member of sheet material lying in a general plane parallel to that of said web at said work station, said carrier member having an article receiving opening therethrough of a shape similar to but smaller than the transverse cross-sectional shape of the article, first means operable when said mold means is in its open position for locating said carrier member in a ready position between said web and at least a portion of said first die assembly with the opening therein aligned with said cavity of said first die assembly, second means on said first die assembly operable upon movement of said mold means to its closed position to engage and flex said carrier member around the periphery of said opening to expand said opening to a size larger than said cross-sectional shape of said article while said mold means is closed, said second means being operable upon subsequent opening of said mold means to release said carrier member to cause said carrier member to resiliently grip the article within said opening, said first means being operable upon the arrival of said mold means at its open position for shifting said carrier member from said ready position with the article gripped therein to a discharge position clear of said mold means.

2. The invention defined in claim 1 wherein said first means comprises means linking a plurality of said carrier members into an endless chain, and drive means for successively advancing said carrier members in step-by-step movement to said ready position in synchronism with said web conveying means.

3. The invention defined in claim 1 wherein said first die assembly comprises a first die member having a recess therein defining the inner end portion of said article forming cavity, said second means having a passage therethrough cooperable with said recess to define the remaining portion of said article forming cavity when said mold means is in its closed position, means mounting said second means between said first die member and said web for movement relative to said first die member between a closed position when said mold means is in its closed position and an open position when said mold means is in its open position, said second means when in its open position being spaced from said first die member by a distance greater than the depth of said article forming cavity.

4. The invention defined in claim 3 wherein said carrier member when in its ready position is located between said first member and said second means.

5. The invention defined in claim 4 wherein said second means comprises a generally flat plate-like member, a cavity forming flange projecting from said plate-like member around the periphery of said passage at the side of said plate-like member adjacent said first member, said flange being coaxially aligned with said opening in said carrier member when said carrier member is in its ready position and being movable into said opening to displace the marginal edge of the opening in said carrier member axially and enlarge the opening to pass said flange upon movement of said mold means to its closed position.

6. The invention defined in claim 2 wherein said first die assembly comprises a first die member, a second die member located between said first die member and said web, means mounting said second die member for movement relative to said first die member between an operative position wherein said first and second die members cooperatively define said article forming cavity and an inoperative position wherein said first and second die members are spaced from each other by a distance greater than the depth of said article forming cavity, and means for causing said drive means to advance said carrier members when said first and second die member are in said inoperative position.

7. The invention defined in claim 6 wherein the carrier member, when in its ready position, is located between said first and second die members and the opening in the carrier member is expanded upon movement of said first and second members to their operative position.

8. In a differential pressure forming machine for forming cavity shaped articles in a web of thermoplastic material, said machine including web conveying means for advancing a web of thermoplastic material in step-by-step movement to a work station, and mold means at said work station cyclically operable to close and open in synchronism with the movement of said web by said web conveying means for forming articles in said web and severing the formed articles from said web upon closing; the improvement wherein said mold means comprises a first and second separable die members located at one side of said web at said work station, said first and second die members being movable relative to each other between a closed position wherein said members define an article forming mold cavity extending through one of said members and into the other and an open position wherein the two members are spaced from each other by a distance greater than the depth of said cavity when said members are closed, an endless chain of expansible and contractible carrier means having a run extending through said work station between said die members, each of said carrier means having an expansible opening therethrough of a normal opening smaller than the width of an article formed in said mold cavity, drive means for driving said chain in step-by-step movement synchronized with movement of said web to successively advance said carrier means to a ready position between said die members with the opening in the carrier means aligned with the cavity defining portions of the die members, and expansion means for expanding the carrier means opening outwardly from the mold cavity upon movement of said die members to their closed position and for releasing the carrier means to permit the carrier means to grip the formed article upon the subsequent opening of said die members.

9. The invention defined in claim 8 wherein said carrier means comprises an annular member of resiliently flexible sheet material.

10. The invention defined in claim 8 wherein a discharge station is provided for said machine downstream from the work station to align with the incremental advance of said web and endless chain of carrier means; said station being defined by a collection member and an article removing member operated synchronously with the closing of the mold means to engage a previously severed and removed article and remove it from said carrier means to said collection member.

11. In a differential pressure forming machine for forming cavity shaped articles in a web of thermoplastic material, said machine including web conveying means for advancing a web of thermoplastic material to a work station, and mold means at said work station cyclically operable to close and open in synchronism with the movement of said web for forming articles in said web and severing the formed articles from said web upon closing; said mold means comprising at least first and second separable die members located at one side of said web at said work station, said first and second die members being movable relative to each other between a closed position wherein said members define an article forming mold cavity extending through one of said members and into the other and an open position wherein the two members are spaced from each other by a distance greater than the depth of said cavity when said members are closed, expansible and contractible carrier means having a movement path extending through said work station between said die members, drive means for driving said carrier means in synchronization with movement of said die members to advance said carrier means to a ready position between said die members, and means for keeping the carrier means expanded during movement of said die members to their closed position and for releasing the carrier means to permit the carrier means to grip the formed article upon the subsequent opening of said die members.

12. In a differential pressure forming machine for forming cavity-shaped articles in a web of thermoplastic material, said machine including web conveying means for advancing a web of thermoplastic material to a work station, and mold means at said work station cyclically operable to close and open in synchronism with the movement of said web for forming articles in said web and severing the formed articles from said web upon closing; said mold means comprising at least first and second separable die members located at one side of said web at said work station, said first and second die members being movable relative to each other between a closed position wherein said members define an article forming mold cavity extending through one of said members and into the other and an open position wherein the two members are spaced from each other by a distance greater than the depth of said cavity when said members are closed, and carrier means having a movement path extending through said work station between said die members and disposed between said members when the members are closed, movable in timed relation with said mold means to convey a severed article from between said mold means to a remote location upon the opening of said mold means.

13. In a differential pressure forming machine for forming cavity-shaped articles in a web of thermoplastic material, said machine including web conveying means for advancing a web of thermoplastic material to a work station, and mold means at said work station having opposed mold parts sandwiching said web cyclically operable to close and open in synchronism with the movement of said web for forming articles in said web and severing the formed articles from said web upon relative movement of said mold parts; one of said mold parts defining an article forming mold cavity, and carrier means, with a plurality of tandemly connected gripper carriers for gripping a part formed in the web, having a movement path extending through said work station between said opposed mold parts; said carrier means being operated to dispose one of said gripper carriers between the mold parts in synchronism with the movement of said web conveying means such that when said carrier means is moved to convey the severed article from between said mold parts a second gripper carrier is brought along to dispose said second gripper carrier between the mold parts for cooperation with the mold parts when closed and to subsequently grip a successively formed part; said carrier means being operable in timed relation with said mold means and web advancing means to convey a severed article from between said mold means to a remote location upon the opening of said mold means.

14. The machine defined in claim 13 wherein said carrier means comprises a series of tandemly connected gripping carriers, one of which is disposed between said mold parts, and when one carrier is moved to convey the severed article from between said mold parts a second carrier is brought along to dispose it between said mold parts, a collection chamber downstream from said mold parts to which a carrier carries a gripped article, and an article separating member operated in synchronism with said mold parts to remove a gripped article from a carrier at the collection station.

15. A method of differential pressure forming cavity shaped articles in a thermoplastic web which is fed between the parts of openable and closable forming and trimming molds, one of which has an article forming cavity formed by a pair of relatively separable, superposed die members with cavity forming side walls and wherein an article carrier having an opening therein is sandwiched between said die members and normally has article gripper means protruding radially inwardly of the cavity forming side walls in the die members comprising the steps of:
 a. relatively moving the die members from separated to closed position and displacing said carrier gripper means from protruding into the die cavity so that the gripper means do not form part of the cavity, while relatively moving the molds from an open to closed position and applying a differential pressure on opposite sides of the web to cause the web to move to assume the configuration of the cavity;

b. while it is supported in the cavity, severing the molded article from the web;

c. relatively moving the parts to separate the molds and the die members and permit the gripper means to return to protruded position and grip the severed article;

d. advancing a new portion of the web between the molds while removing the portion formerly between the molds; and e. advancing the carrier to transport the severed article to a remote location while disposing a second carrier in position between said die members.

16. The method of claim 15 wherein the carrier gripper means is displaced radially by the die member adjacent the web when it moves to closed position with the other die member, the said die member adjacent the web having a recess to accommodate the carrier when the die members are closed so that the carrier can nest therein.

17. A method of differential pressure forming cavity shaped articles in a thermoplastic web which is fed between openable and closable forming and trimming molds, one of which has an article forming cavity and wherein one of a series of tandemly connected article carriers is disposed between said molds comprising the steps of:

a. displacing said one article carrier radially from the cavity so that the carrier does not form part of the cavity, while relatively moving the molds from an open to closed position and applying a differential pressure on opposite sides of the web to cause the web to move to assume the configuration of the cavity;

b. while it is supported in the cavity, severing the molded article from the web;

c. relatively moving the molds to separate them and to permit the carrier to return to grip the severed article;

d. advancing a new portion of the web between the molds while removing the portion formerly between the molds; and e. advancing the one carrier to transport the severed article to a remote location while disposing a second carrier in position between said molds.

18. A method of differential pressure forming cavity shaped articles in a deformable, moldable first thermoplastic web section which is fed between openable and closable forming and trimming mold members, one of which has an article forming cavity, and wherein an article carrier is sandwiched between said mold members on one side of said web and has successively disposed carrier article gripper means comprising the steps of:

a. relatively moving the mold members from separated toward closed position while said carrier is situated between the mold members and while applying a differential pressure on opposite sides of the web to cause the web to move to assume the configuration of the cavity and form a part in the web;

b. Severing the part formed the web and gripping the part with a first carrier article gripper means;

c. moving the mold members to separated position;

d. advancing the carrier to move the gripped part from between the mold members to a part collection station while advancing a second carrier article gripper means; and e. advancing a new web section between the mold members while removing the web section formerly between the mold members.

* * * * *

UNITED STATES PATENT AND TRADEMARK OFFICE
CERTIFICATE OF CORRECTION

PATENT NO. : 4,464,329
DATED : August 7, 1984
INVENTOR(S) : Robert C. Whiteside et al It is certified that error appears in the above-identified patent and that said Letters Patent are hereby corrected as shown below:

Column 10, line 28, after "formed" insert -- from --.

Signed and Sealed this

Nineteenth Day of February 1985

[SEAL]

Attest:

DONALD J. QUIGG

*Attesting Officer*      *Acting Commissioner of Patents and Trademarks*